(12) United States Patent
Kaneko et al.

(10) Patent No.: US 7,636,520 B2
(45) Date of Patent: Dec. 22, 2009

(54) LIGHT-EMITTING UNIT AND SUPERIMPOSING DEVICE

(75) Inventors: Hidefumi Kaneko, Tokyo (JP); Takaaki Yano, Hokkaido (JP)

(73) Assignee: Hoya Corporation, Tokyo (JP)

( * ) Notice: Subject to any disclaimer, the term of this patent is extended or adjusted under 35 U.S.C. 154(b) by 243 days.

(21) Appl. No.: 11/750,436

(22) Filed: May 18, 2007

(65) Prior Publication Data

US 2008/0170849 A1 Jul. 17, 2008

(30) Foreign Application Priority Data

May 19, 2006 (JP) ............................. 2006-139918

(51) Int. Cl.
*G03B 17/20* (2006.01)
(52) U.S. Cl. ..................................... 396/296
(58) Field of Classification Search ................. 396/384, 396/296, 385, 386
See application file for complete search history.

(56) References Cited

U.S. PATENT DOCUMENTS 3,631,784 A * 1/1972 Jurenz ........................ 396/271
4,053,912 A * 10/1977 Okuno et al. ................ 396/384
4,062,026 A * 12/1977 Fujita .......................... 396/317
4,128,321 A * 12/1978 Kobori et al. ................ 396/271
5,754,900 A * 5/1998 Suda .......................... 396/296
6,292,629 B1 * 9/2001 Sensui ........................ 396/147
7,046,925 B2 5/2006 Kaneko et al.

FOREIGN PATENT DOCUMENTS

JP 2000089336 3/2000

OTHER PUBLICATIONS

English language Abstract of JP 2000-089336.

* cited by examiner

*Primary Examiner*—W. B. Perkey
*Assistant Examiner*—Noam Reisner
(74) *Attorney, Agent, or Firm*—Greenblum & Bernstein, P.L.C.

(57) ABSTRACT

A light-emitting unit for superimposement is provided. The light-emitting unit is applied to one of a pentagonal roof-mirror or a pentagonal Dach-prism of a viewfinder optical system of a camera. The unit comprises a light source, a light-emitting lens, and a second mirror. The light source emits superimposing light. The second mirror reflects light emitted from the light source and passed through the light-emitting lens toward a third reflection face of one of a pentagonal roof-mirror or a pentagonal Dach-prism. The light source, the light-emitting lens, and the second mirror are integrally assembled as a unit.

4 Claims, 6 Drawing Sheets

LIGHT-EMITTING UNIT AND SUPERIMPOSING DEVICE

BACKGROUND OF THE INVENTION

1. Field of the Invention

The present invention relates to a device that superimposes information on an image viewed through a viewfinder.

2. Description of the Related Art

In a single-lens reflex camera, an image of an object is formed on a focal plane plate and is viewed through a viewfinder via an image investing optical device, such as a pentagonal Dach-prism or a roof pentaprism. In terms of a system that superimposes information on the object image, a system that superimposes a point(s) and an area (s), where a distance is being measured, by using light made incident through the third reflection face of the pentagonal Dach-prism, is known. Further, a viewfinder system that employs a pentagonal roof-mirror in place of a pentagonal Dach-prism is also known.

SUMMARY OF THE INVENTION

However, in an application where the superimposed light is made incident through the third reflection face of the pentagonal Dach-prism, a triangular prism reflector that directs the superimposed light to the third reflection face is required to be accurately positioned in relation to the third reflection face. Therefore, it takes substantial time to position the triangular prism reflector optically in place and the number of assembly parts also increases. In particular, when a pentagonal roof-mirror is used, the third reflection face would be deformed since the triangular prism reflector is bore upon the third reflection face via a spacer.

An object of the present invention is to provide a light-emitting unit and a superimposing device for the viewfinder that reduces assembly costs. Further an object of the present invention is to reduce the weight of the viewfinder system and prevent a ghost image being generated when superimposing information.

According to the present invention, a light-emitting unit for superimposement is provided. The light-emitting unit is applied to one of a pentagonal roof-mirror or a pentagonal Dach-prism of a viewfinder optical system of a camera.

The light-emitting unit comprises a light source, a light-emitting lens, and a mirror. The light source emits the superimposing light. The mirror reflects light which is emitted from the light source and passed through the light-emitting lens toward a third reflection face of one of either a pentagonal roof-mirror or a pentagonal Dach-prism. The light source, the light-emitting lens, and the mirror are integrally assembled as a unit.

Further, according to the present invention, a superimposing device is provided that is applied to the viewfinder optical system, and includes an image inverting optical system. The image inverting optical system comprises the first and the second reflection faces which form a roof-shape and the third reflection face that reflects light reflected from the first and the second reflection faces toward an ocular optical system. The superimposing device comprises a light-emitting unit and a support member.

The light-emitting unit is integrally provided with a light source, a light-emitting lens, and a mirror that reflects light which is emitted from the light source and passed through the light-emitting lens toward the backside of the third reflection face. The light-emitting unit and the image inverting optical system are mounted on the support member. Further, the light-emitting unit and the image inverting optical system are mounted on the support member separately, and the mirror is disposed adjacent to the backside of the third reflection face.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
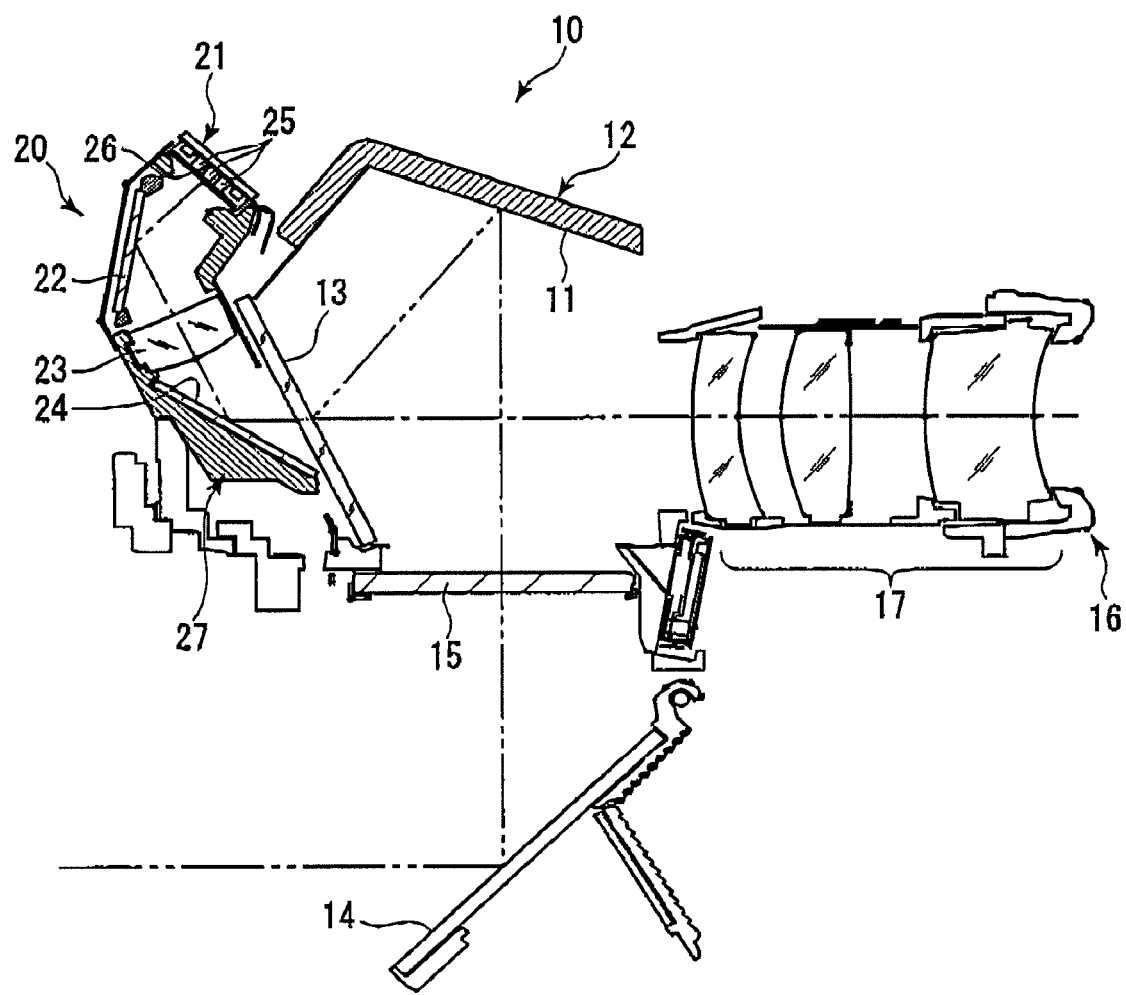
FIG. 1 schematically illustrates the structures of the superimposing device of an embodiment of the present invention.

The present invention is described below with reference to the embodiments shown in the drawings.

FIG. 1 schematically illustrates the structures of the superimposing device as applied to an optical system such as a viewfinder, to which an embodiment of the present invention is applied.

For example, the optical system of the viewfinder of the present embodiment includes a pentagonal roof-mirror 10 (alternatively be a pentagonal Dach-prism). The pentagonal roof-mirror 10 includes a pentagonal roof-section 12 and the third reflection face 13. Further, the pentagonal roof-section 12 includes Dach-mirrors 11 (first and second reflection faces). Light made incident through a photographing lens is reflected on a quick return mirror 14 toward a focal plane plate 15 and forms the image of the object.

The pentagonal roof-section 12 is provided above the focal plane plate 15. The light from the focal plane plate 15 is reflected on the Dach-mirrors 11 of the pentagonal roof-section 12 and then reflected on the third reflection face 13, which is a half mirror, toward an ocular optical system 17 of the viewfinder 16. Therefore, a user can observe an object's image, which is projected on the focal plane plate 15, through the ocular optical system 17 provided for the viewfinder 16.

In the present embodiment, a light-emitting unit 20, which is used to superimpose light rays from a light source onto the image observed through the viewfinder, is arranged behind the third reflection face (the half mirror) 13. The light-emitting optical system of the light-emitting unit 20 includes a light source section 21, a first mirror 22, a light-emitting lens 23, and a second mirror 24.

The light source section 21 is provided with a plurality of LEDs 25 and a diffusion sheet 26. The diffusion sheet 26 has a plurality of perforations having predetermined size and each of the perforations is arranged at a position corresponding to each of the LEDs 25, so that diffusion light is emitted through each of the perforations. The light rays from the diffusion sheet 26 are reflected by the first mirror 22 and made incident into the light-emitting lens 23. The light rays from the light-emitting lens 23 are then reflected by the second mirror 24 and pass through the third reflection face 13 onto the pentagonal roof-mirror 10. Inside the pentagonal roof-section 12, the light rays proceed toward the ocular optical system 17 along and substantially parallel with the optical axis of the ocular optical system 17. Note that the backside (incident face) of the third reflection face 13, where the light from the light-emitting unit 20 is made incident, is multi coated.

Thereby, within the scope of the viewfinder, an image of a point source(s), which corresponds to the position of a measurement area(s), is superimposed on the object's image and the above superimposed image can be observed by a photographer. For example, the light rays from the perforations of the diffusion sheet 26 are superimposed at a position corresponding to an area where the measurement is being carried out so that a photographer can identify the position on which the camera is focusing. Further, the indication of the measurement area may also be used to select the area.

Figure 2:
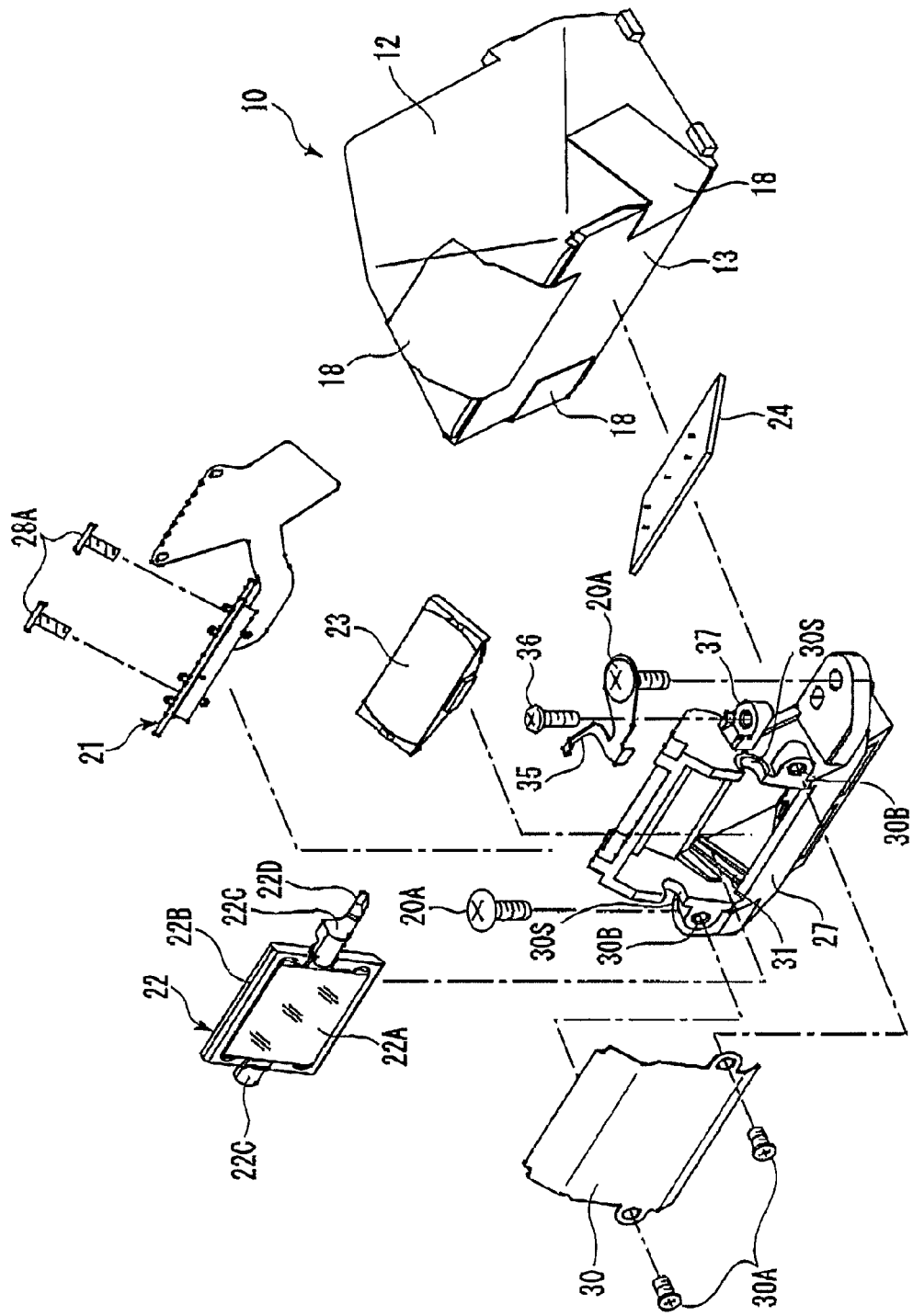
FIG. 2 is a perspective view of the exploded state light-emitting unit and the pentagonal roof-mirror.

FIG. 2 is a perspective view of the light-emitting unit 20 and the pentagonal roof-mirror 10 from the upper front side. The pentagonal roof-mirror 10 is illustrated as a half mirror where the third reflection face 13 has already been attached. On the other hand, the light-emitting unit 20 is illustrated in an exploded state. The light source section 21, the first mirror 22, the light-emitting lens 23, and the second mirror 24, which make up the light-emitting optical system, are attached to a holder 27 and assembled together in an integral assembly, i.e., the light-emitting unit 20.

Figure 3:
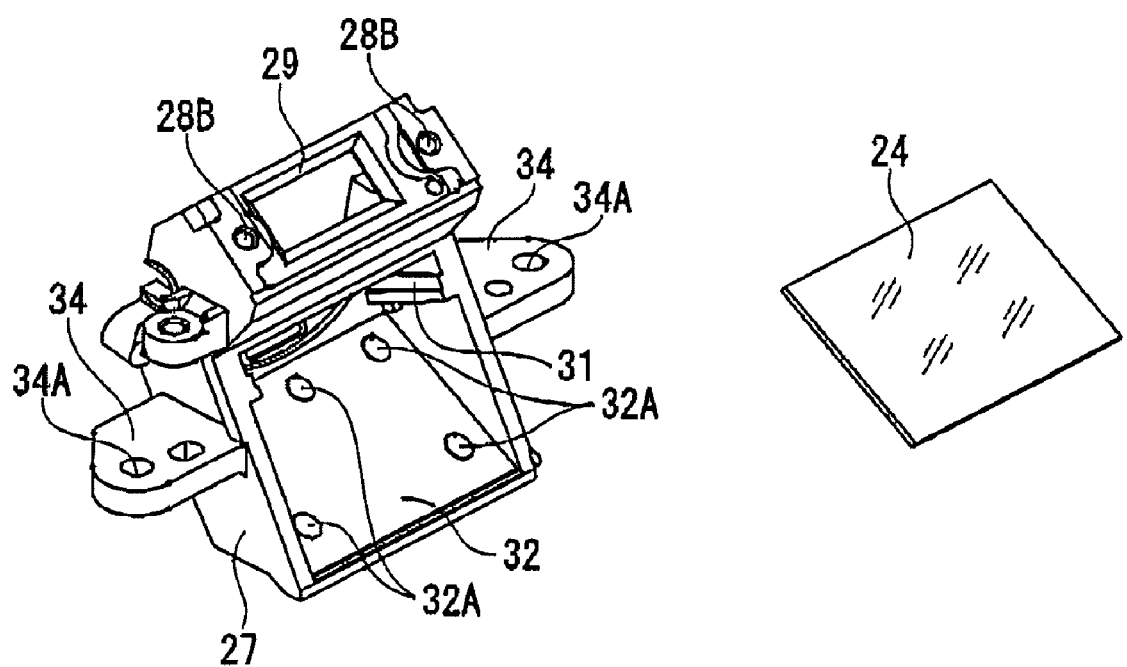
FIG. 3 is a perspective view of the holder and the second mirror from the upper rear side.
Figure 4:
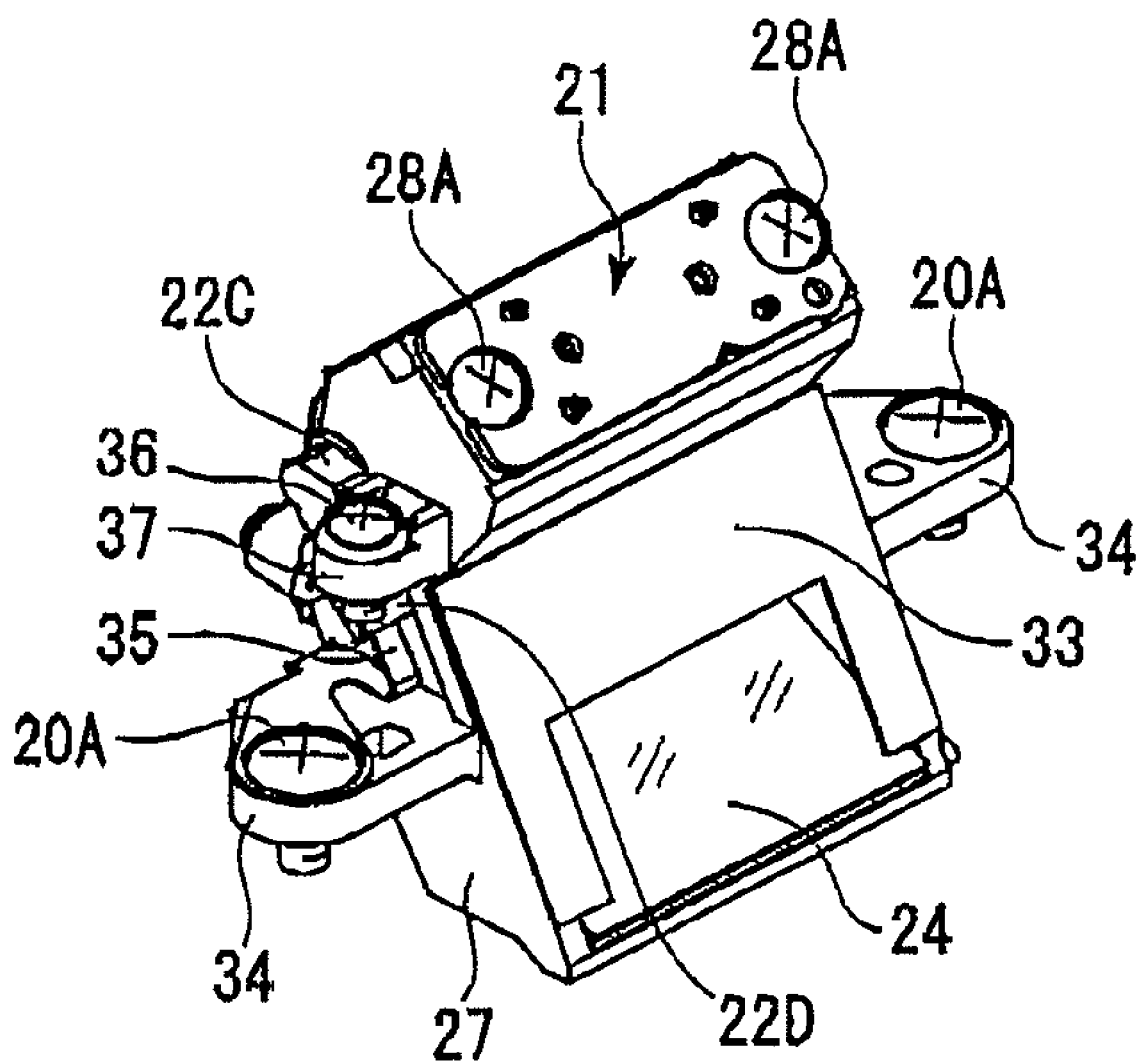
FIG. 4 is a perspective view of the assembled light-emitting unit.

FIG. 3 is a perspective view of the holder 27 and the second mirror 24 from the upper rear side. In FIG. 3, the second mirror 24 is shown as being separate from the holder 27 to indicate the face of the holder 27 to which the second mirror 24 is attached. In FIG. 4, a perspective view of the light-emitting unit 20 is shown with the light source section 21, the first mirror 22, the light-emitting lens 23, and the second mirror 22 assembled onto the holder 27.

As shown in FIG. 2, the half mirror (the third reflection face) 13 is attached and fixed to the pentagonal roof-section 12 using affixing tapes 18. Further, the light-emitting unit 20 is attached to the holder with a pair of screws 28A screwed into screw holes 28B provided on the holder 27 and the body of the light source section 21, and fitted into an opening 29 that is provided on the holder 27.

The first mirror 22 includes a mirror 22A, a frame 22B that retains the mirror 22A, and a pair of shafts 22C that extend out from either side of the frame 22B. The shafts 22C are docked into shaft bearings 30S so that the first mirror 23 is rotatable about an axis perpendicular to the optical axis of the light-emitting optical system. After the shafts 22C are fitted into the shaft bearings 30S, a first cover member 30 that covers the first mirror 22 is attached to the holder 27 by fixing screws 30A into the screw holes 30B provided on the holder 27.

The light-emitting lens 23 is placed inside the holder 27 from the opposite side of the first cover member 30, which is the side shown in FIG. 3, and attached to a lens mount section 31 that is formed on the holder 27. Further, the second mirror 24 is also placed into the holder 27 from the same side as the light-emitting lens 23 and is place on and affixed to a second mirror retaining face 32 provided on the holder 27.

Note that protuberances 32A for positioning and fixing the position of the second mirror 24 are provided on the second mirror retaining face 32 and they abut against the backside of the second mirror 24. When the light-emitting lens 23 and the second mirror 24 are mounted on the holder 27, a second cover member 33 is attached to the holder 27 so that the light-emitting lens 23 is covered with the second cover member 33.

Figure 5:
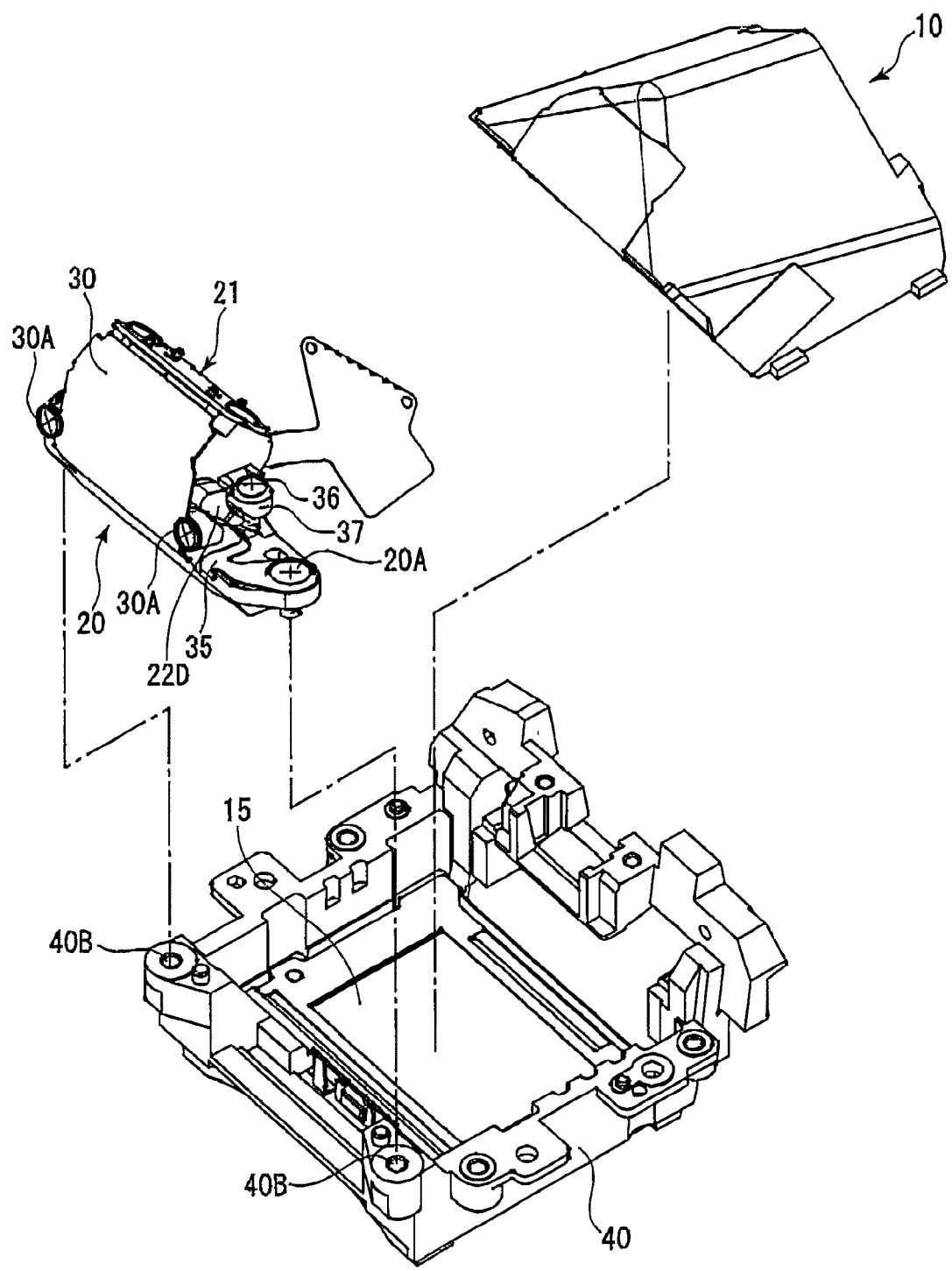
FIG. 5 is a perspective view showing the state before the pentagonal roof-mirror and the light-emitting unit are attached on the focal plane plate retaining frame.
Figure 6:
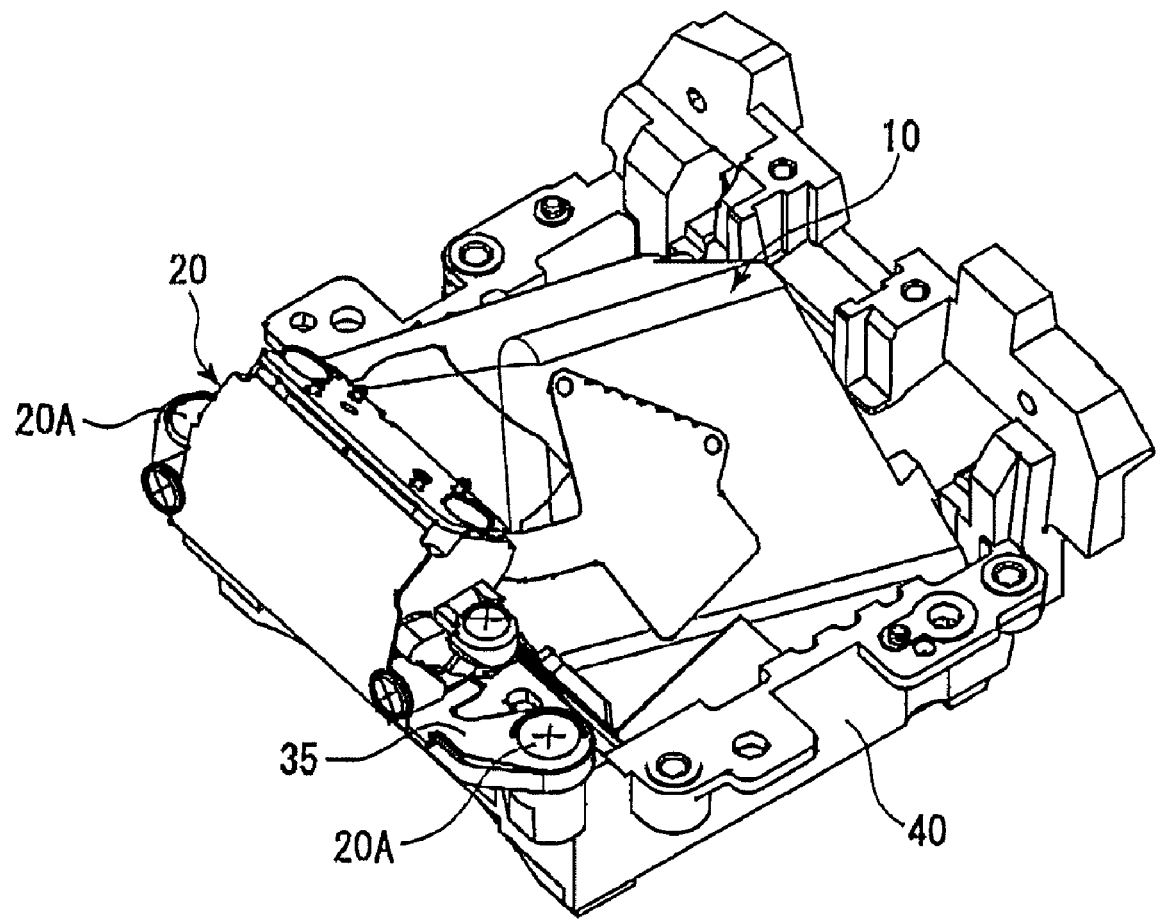
FIG. 6 is a perspective view showing the state after the pentagonal roof-mirror and the light-emitting unit are attached on the focal plane plate retaining frame.

The light-emitting unit 20 is fixed to a focal plane plate retaining frame 40 (see FIGS. 5 and 6) that retains the focal plane plate 15 with screws 20A, and the focal plane plate retaining frame 40 is fixed to the camera body (not shown). The holder 27 has screw mounts 34A that extend out from both sides of the holder 27 and the screws 20A are installed therein. Namely, the screws 20A are inserted into each of the holes 34A provided on each of the screw mounts 34 and are screwed into screw holes 40B that are provided on the focal plane plate retaining frame 40. The state before the pentagonal roof-mirror 10 and the light-emitting unit 20 are attached on the focal plane plate retaining frame 40 is shown in FIG. 5, as a perspective view, and the state after the assembly is shown in FIG. 6.

Further, a plate spring 35 (a return spring) is attached to one of the screws 20A and is secured to one of the screw mounts 34. The plate spring 35 is a biasing member that engages with one of the shafts 22C of the first mirror 22 and which gives rotational biasing force thereto. Namely, a lever 22D is provided on the shafts 22C, which radially extends out from the shaft 22C in the rotational axis, and the plate spring 35 bears upon the lever 22D in order to give a rotational biasing force to the shaft 22C.

The rotation of the lever 22D is restricted by an adjust screw 36. Namely, an adjust screw mount 37 which the adjust screw 36 is screwed into is provided on the holder 27 and the tip of the adjust screw 37, which protrudes from the adjust screw mount 37 abuts on the lever 22D (which is biased by the plate spring 35) to restrict its rotation. Thereby, the angle of the first mirror 22 can be finely adjusted by adjusting the amount of protrusion of the adjust screw 36.

As described above, according to the embodiment of the present superimposing device, the second mirror can be integrated with the light-emitting unit since the mirror is used as the second mirror in place of a prism. This is because the second mirror does not require accurate positioning with respect to the third reflection face, when compared with a prism that is required to bear upon the third reflection face. Thereby, the light-emitting unit can be separately mounted adjacent to the pentagonal roof-mirror, without acting external force upon the third reflection face 13, so that the cost and time of production can be reduced.

Further, when a prism is bearing upon the third reflection face, the angles and position of the prism are required to be strictly adjusted to avoid total reflection of the superimposing light rays. However, according to the structure of the present embodiment, it could be accommodated by adjusting the angle of the first mirror 22. Further, when abutting the prism against the third reflection face of the pentagonal roof-mirror, erroneous displacement of the position of a point source image increases as the errors in the installation angles of the prism increase. In contrast, according to the present embodiment, which uses a mirror as the second mirror 24, the displacement of the point source image is only dependent on the thickness of the third reflection face or the half mirror, thus measures to reduce ghost images (e.g., coating) can be relaxed.

Further, according to the present embodiment, since a mirror is applied in place of the prism, the distance between the light-emitting lens and the diffusion sheet or the light source is reduced and thus the size of the light-emitting unit is reduced.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-139918 (filed on May 19, 2006) which is expressly incorporated herein, by reference, in its entirety.

The invention claimed is:

1. A light-emitting unit for superimposement applied to one of a pentagonal roof-mirror and a pentagonal Dach-prism of a viewfinder optical system of a camera, comprising:

a light source that emits superimposing light;

a light-emitting lens; and a mirror that reflects light emitted from said light source and passed through said light-emitting lens toward a third reflection face of one of said pentagonal roof-mirror and said pentagonal Dach-prism;

wherein said light source, said light-emitting lens, and said mirror are integrally assembled as a light-emitting unit, and said light-emitting unit attaches to a distinct support member on which said pentagonal roof-mirror or pentagonal Dach-prism is mounted, such that said mirror is disposed adjacent to and spaced from a backside of said third reflection face.

2. A light-emitting unit according to claim 1, further comprising a sub mirror that reflects the light from said light source toward said mirror and wherein an angle of said sub mirror is adjustable.

3. A superimposing device applied to a viewfinder optical system including an image-inverting optical system that comprises first and second reflection faces which form a roof-shape, and a third reflection face that reflects light reflected from said first and said second faces toward an ocular optical system, said superimposing device comprising:

a light-emitting unit that is integrally provided with a light source, a light-emitting lens, and a mirror at reflects light emitted from said light source and passed through said light-emitting lens toward a backside of said third reflection face; and a support member onto which said light-emitting unit and said image-inverting optical system are mounted;

wherein said light-emitting unit and said image-inverting optical system are mounted on said support member separately, and said mirror is disposed adjacent to and spaced from the backside of said third reflection face.

4. A superimposing device according to claim 3, wherein said image-inverting optical system comprises a pentagonal roof-mirror and said third reflection face comprises a half mirror.

* * * * *